United States Patent [19]

Goldmann et al.

[11] Patent Number: 5,366,513

[45] Date of Patent: Nov. 22, 1994

[54] PREPARATION OF GRANULATED ALKALINE EARTH METAL CARBONATE

[75] Inventors: Dieter Goldmann, Hanover; Ludwig Pfeifer, Bad Hoenningen; Karl Koehler, Diekholzen; Peter Wallbrecht, Hanover; Norbert Mingels, Dinslaken, all of Germany

[73] Assignee: Solvay Barium Strontium GmbH, Hanover, Germany

[21] Appl. No.: 29,651

[22] Filed: Mar. 11, 1993

[30] Foreign Application Priority Data

Mar. 13, 1992 [DE] Germany .............................. 4207923

[51] Int. Cl.$^5$ ............................ B01J 2/28; C01F 5/24
[52] U.S. Cl. .................................... 23/293 R; 423/430
[58] Field of Search ...................... 23/293 R; 423/430

[56] References Cited

U.S. PATENT DOCUMENTS

| | | | |
|---|---|---|---|
| 4,806,331 | 2/1989 | Adams, Jr. et al. | 23/293 R |
| 4,888,161 | 12/1989 | Adams, Jr. et al. | 23/293 R |
| 4,888,308 | 12/1989 | Adams, Jr. et al. | 23/293 R |

*Primary Examiner*—Wayne Langel
*Attorney, Agent, or Firm*—Evenson, McKeown, Edwards & Lenahan

[57] ABSTRACT

A method for preparing granulated alkaline earth metal carbonate, particularly barium carbonate or strontium carbonate, by adding a binding agent and optionally water; granulating the resulting mixture, preferably in the presence of water; drying the granular product; and optionally subjecting the granular product to a high-temperature treatment, in which the material to be granulated and the granulated material do not contact any inorganic refractory material during the granulation, during subsequent drying, and during any high-temperature treatment.

8 Claims, No Drawings

PREPARATION OF GRANULATED ALKALINE EARTH METAL CARBONATE

BACKGROUND OF THE INVENTION

This invention relates to a method for preparing granulated alkaline earth metal carbonate, to granulated alkaline earth metal carbonate produced by the method of the invention, and to use of such granulated alkaline earth metal carbonate in the glass industry.

Alkaline earth metal carbonate, particularly barium carbonate and strontium carbonate, are used in the glass industry, for example in the manufacture of faceplates for television receivers. In this way X-rays from cathode ray tubes can be absorbed.

One method for producing very pure alkaline earth metal carbonates is the precipitation of alkaline earth metal hydroxides or alkaline earth metal sulfides with carbon dioxide or carbonates. In this process very fine powders are formed, which are difficult to handle. In the past, such powders have been granulated by sintering at about 800° C. in rotary kilns which are lined with inorganic refractory materials, e.g., with amorphous silicon dioxide, aluminosilicates or fire clay. In such kiln granulation processes, it is absolutely impossible to prevent detritus of refractory material from contaminating the granules. Due to these impurities, a considerable proportion of the picture tubes produced have to be considered unusable and must be remelted.

Adams et al., U.S. Pat. No. 4,888,161 describes a method for decreasing the contamination of the carbonate by detritus of refractory material attributable to the high sintering temperature of 800° C. In that process, a suspension of the carbonate in water initially is prepared, and an amount of a deflocculant sufficient to deflocculate the carbonate is added. Preferred deflocculants are alkali metal salts or ammonium salts of acrylic acid or methacrylic acid or of phosphoric acid or polyphosphoric acid. The fluid suspension is then dried in a spray dryer, and the resulting granular product is heated to 600° to 700° C. The type of heating used is described as not critical.

There remains a need for an improved method of producing granulated, high purity alkaline earth metal carbonate.

SUMMARY OF THE INVENTION

It is the object of the invention to provide an improved method of producing granulated alkaline earth metal carbonate.

Another object of the invention is to provide a method of producing granulated alkaline earth metal carbonate in a technically simple manner.

A further object of the invention is to provide a method of producing a granular alkaline earth metal carbonate which is absolutely free of inorganic refractory materials.

An additional object of the invention is to provide granulated, alkali metal carbonate absolutely free of inorganic refractory materials.

These and other objects of the invention are achieved by providing a method for preparing granulated calcium carbonate, barium carbonate or strontium carbonate, comprising granulating an alkaline earth metal carbonate selected from the group consisting of calcium carbonate, barium carbonate and strontium carbonate in the presence of a binding agent, wherein said alkaline earth metal carbonate is maintained out of contact with inorganic refractory materials during and after said granulating step. The alkaline earth metal carbonate may be granulated in the presence of water, and the granulated alkaline earth metal carbonate may optionally be subjected to a subsequent drying step and/or to a subsequent calcining step while maintaining it out of contact with inorganic refractory materials.

According to a further aspect of the invention, the objects are achieved by providing a granulated and dried calcium carbonate, barium carbonate or strontium carbonate, free of inorganic refractory materials, and having a binding agent content of 0.05 to 5 wt.-%.

DETAILED DESCRIPTION OF PREFERRED EMBODIMENTS

The method of the invention for the preparation of granulated calcium carbonate, barium carbonate or strontium carbonate is characterized in that calcium carbonate, barium carbonate or strontium carbonate is first granulated in the presence of a binding agent and optionally water, then dried if desired, and subjected, if desired, to a high-temperature treatment and in that contact is avoided between the calcium carbonate, barium carbonate or strontium carbonate and inorganic refractory materials, during the granulation, during any drying, and during any high-temperature treatment if such is performed.

The amount of binding agent in the granulated product can vary widely. Preferably the binding agent is contained in an amount of from about 0.05 to about 5 wt.-% of the dry weight of the product.

In accordance with an especially simple embodiment of the invention, the product to be granulated is treated in anhydrous form with an appropriate binding agent and then merely granulated. Suitable binding agents are those which have adhesive properties even in the absence of water. Drying in this case is unnecessary. If desired, the granules can be subjected to a high-temperature treatment. As used herein, the term "high-temperature treatment" refers to heating to a temperature above 300° C. up to the sintering temperature of the granules, preferably 500° C. to 700° C., especially from 500° C. to 600° C.

In accordance with a preferred embodiment of the invention the granulation is carried out in the presence of water, and the granulated material is dried after the granulation. In this case it is likewise possible to follow the drying with a high-temperature treatment.

The granulation can be carried out by known methods and using known apparatus. For example, a roller granulation, mixed granulation or compacting granulation can be used. Suitable apparatus include, for example, granulating drums, granulating disks, plate mixers, spray mixing drums, auger trough mixers or roller presses. High-speed mixers, e.g., the "Recycler CB" high-speed mixer made by Loedige, plate granulators or combination granulators, such as plowshare mixers by Loedige, are especially suitable.

If a drying and/or high-temperature treatment is performed, conventional drying apparatus can be used, except for those which are lined with inorganic refractory materials. Drum dryers or fluid-bed dryers are well suited, for example. If both drying and high-temperature treatment are performed, these two treatments are preferably separated for technical reasons. The drying preferably is performed at a temperature of about 100° C. to about 250° C. Alternatively, however, the drying and high-temperature treatment can also be performed in a single step.

In accordance with one preferred variant of the method of the invention, the granulation is performed in the presence of both water and a binding agent, and then the granular product is dried, but no high-temperature treatment is performed. The water that is present can be introduced into the material to be granulated either by using carbonate material which contains water and/or by using a binding agent which contains water, preferably in the form of a binding agent solution. Of course, it is possible to start out with dry materials and add the desired amount of water, for example by spraying, especially in the form of an aqueous solution of the binding agent. The moisture content can also be adjusted by mixing together moisture-containing filter cake from the carbonate precipitation and dry carbonate in powder or granulated form.

The amount of water can vary depending on the granulating equipment used. If, for example, a high-speed mixer or a combination granulating apparatus is used, the moisture content can be quite high, and can amount, for example, to as much as 70% by weight or more, in the mixture. Here, for example, one can use the still-moist filter cake which is obtained in the carbonate precipitation followed by pressing out the water. If the granulation is performed by roller granulation, the moisture content should be lower, and preferably will amount to up to 10% by weight. For example, roller granulation can be performed by mixing dry carbonate with dry binding agent and carbonate agglomerates as granulation seeds, and spraying with the desired amount of water or binding agent in the granulating apparatus.

Suitable binding agents include, in particular, water-soluble organic polymeric or oligomeric saccharides such as starch, boiled native potato starch, dextrin (e.g., Avidex 58-MD-14 from AVEBE), cold-soluble potato starch, (e.g., Paselli WA-4), cold-soluble wheat starch (e.g., Cremocine B). Also suitable are modified natural polymers such as carboxymethylcellulose (e.g., Tylose H20, Tylose C30 or Tylose MH50 from Hoechst). Synthetic polymers such as polyvinyl alcohol (e.g., Mowiol 4-88) or sodium polyacrylate (e.g., Sokalan PA20) can also be used. Silicic acid esters or water glass are also suitable.

As noted above, the binding agent can be present in the product to be granulated in an amount from about 0.05 to about 5 weight-percent of the dry weight. Preferably the binding agent is contained in the mixture to be granulated in the amount of 1 to 5%, especially 1.5 to 3%, by weight, if a high-temperature treatment is not to be used.

In accordance with another preferred variant of the present invention, the granulation is performed in the presence of water and binding agent, the granulated material is then dried, and the material is additionally subjected to a high-temperature treatment. The amount of binding agent can be 0.05 to 3%, by weight, of the dry mass. Preferably, the amount of binding agent is in the low range, for example in the range from 0.05 to 0.9%, by weight, of the dry mass. Particularly good results have been obtained with binding agent contents in the range from 0.3 to 0.9%, by weight, of the dry mass.

Many water-soluble inorganic or organic compounds can be used as binding agents. Highly suitable binding agents include, for example, alkali hydroxides (or their lyes), water-soluble silicates, especially water glass, silicic acid esters, natural or synthetic organic oligomers or polymers such as dextrin, sodium polyacrylate, e.g., the commercial products Sokalan PA20, PA25 or PA30, or polyvinyl alcohol, e.g., Moviol 4-88 made by Hoechst. Combinations of alkali metal hydroxides (or their lyes) and sodium polyacrylate are also highly suitable. In that case, preferably 0.1 to 0.3 wt.-% of $Na_2O$ in the form of NaOH and 0.3 to 0.6 wt.-% of sodium polyacrylate are contained in the material to be granulated, each with respect to the dry weight.

The invention further relates to the granulated calcium carbonate, barium carbonate or strontium carbonate produced according to the method of the invention by granulation and optional drying and/or heat treatment, which is free of inorganic refractory materials and has a binding agent content of 0.05% to 5% by weight. Preferred binding agents include alkali lyes, water glass, silicic acid esters, starch, native potato starch, dextrin, cold-soluble potato starch, cold-soluble wheat starch, polyvinyl alcohol, sodium polyacrylate, sodium polymethacrylate or mixtures thereof, and especially combinations of alkali metal hydroxide and sodium polyacrylate. The particle size is preferably less than 1 millimeter.

The method of the invention enables the preparation of alkaline earth metal carbonates, especially barium carbonate and strontium carbonate, in a technically simple manner. A product is obtained which has a narrow range of particle sizes. The average particle diameter can be adjusted and controlled in a simple manner. The free flow of the granules according to the invention that have sufficient hardness is very good.

The granular products according to the invention can be used for purposes for which alkaline earth metal carbonates are conventionally used. Due to their advantageous properties, especially the fact that they are free of inorganic refractory materials, they are especially suitable for use in the glass industry, particularly in the production of faceplates for picture tubes.

Further aspects of the invention will become apparent from a consideration of the following examples, which are intended to be illustrative and are not limiting on the scope of the invention.

EXAMPLE 1

Preparation of Granulated Strontium Carbonate in a High-Speed Mixer.

Precipitated strontium carbonate in the form of a moist filter cake, which originated directly from the precipitation of strontium carbonate and had a moisture content between 35 and 45% by weight, was mixed in a high-speed mixer with finely divided, moisture-free strontium carbonate from a previous production of granules, plus soda lye and a sodium polyacrylate, Sokalan PA20. The amounts of the ingredients were adjusted so that the moisture content was established at about 4 to 5 wt.-%, the content of $Na_2O$ at 0.2 wt.-%, and the sodium polyacrylate content at 0.5 wt.-%, the last two contents being stated with respect to the dry mass. The material leaving the high-speed mixer was dried in a fluidized bed dryer. The fluidized bed dryer was provided with heat exchanger equipment which was set at 200° C. The material leaving the fluidized bed dryer had an exit temperature of about 85° to 90° C. The dried material was then subjected to a high-temperature treatment which also was performed in a fluidized bed dryer in which the granular product was contacted by combustion gases heated to 750° C. The granular product exit temperature was 625° to 680° C. The granular product was then cooled and screened to the desired particle diameter. Coarse material was crushed and re-screened; fines were added as dry material to the high-speed mixer in a later mixing procedure. The particle diameter of the screened granular strontium carbonate product ranged from 0.2 to 0.8 mm.

EXAMPLE 2

Preparation of Granulated Strontium Carbonate in a Roller Press with High-Temperature Treatment.

Dry, finely divided strontium carbonate was used. The binding agent was a combination of sodium polyacrylate and sodium hydroxide in the form of an aqueous solution. The soda lye was used in such an amount that 0.1 wt.-% of $Na_2O$ was present in the form of soda lye in the material to be granulated. The sodium polyacrylate ("Sokalan PA20 ™" from BASF) was added in such an amount that 0.5 wt.-% of sodium polyacrylate was present in the material to be granulated. The binding agent solution was added to the material, the resulting mixture was dried, and then the dried material was granulated in a roller press by press agglomeration. Then the granular product was heated at 600° C. (in this case the drying and high-temperature treatment were performed directly one after the other). A hard granular product was obtained.

EXAMPLE 3

Preparation of Granulated Barium Carbonate with High-Temperature Treatment.

The procedure of Example 2 was repeated except powdery, finely divided barium carbonate was used as the material to be granulated. The resulting granules were similar to those obtained in Example 2.

EXAMPLE 4

Preparation of Granulated Strontium Carbonate with Polyvinyl Alcohol as Binding Agent.

The procedure of Example 2 was repeated except a combination of caustic soda solution and polyvinyl alcohol (Mowiol 4-88 ™ from Hoechst) was used as the binding agent. In a direct comparison, the granules produced using polyacrylate in accordance with Example 2 proved to be harder.

EXAMPLE 5

Preparation of Granulated Strontium Carbonate on a Granulating Plate.

a) Production of seeds:
Balls with a diameter of 10 to 30 mm were formed on the granulating plate from strontium carbonate powder, soda lye and Sokalan PA20 plus a little water, and then were crushed. The crushed material was allowed to dry overnight. Then the material was reduced to particles of about 0.8 mm diameter.

b) Granulation by accretion:
The seeds formed in accordance with Example 5a) were placed on the turntable, and fine strontium carbonate and water containing soda lye and Sokalan PA20 were slowly added to the turntable in a weight ratio of 5.4:1. As soon as the spherical granules reached the desired diameter (in this case about 1 mm), the fraction with a particle diameter of 0.4 to 1.0 mm was withdrawn as the product fraction. Oversize grains with a diameter greater than 1 mm were crushed and added to the undersize grains having a diameter of less than 0.4 mm to serve again as seeds.

The product fraction was then dried at 150° C. in the oven. It consisted of 99.2 wt.-% of strontium carbonate, 0.5 wt.-% of Sokalan PA20, and 0.3 wt.-% of $Na_2O$.

The product was then subjected to a high-temperature treatment at 600° C. A hard, spherical granular product was obtained.

EXAMPLE 6

Preparation of Granulated Strontium Carbonate without High-Temperature Treatment.

The granulation was performed in an intensive mixer sold by Eirich. Dry strontium carbonate was obtained, and to the dry strontium carbonate was added moist carbonate in the form of a water-containing filter cake as produced by strontium carbonate precipitation. The moisture content was 35 to 45 weight-percent. The resulting strontium carbonate containing 12% by weight moisture was mixed in a high-speed mixer with boiled native potato starch solution, so that the potato starch content amounted to 2% of the weight of the dry mass. The product leaving the high-seed mixer was then dried at a temperature of 150° C. A hard granular product was obtained.

Example 6 was repeated using the following binding agents:
I. Dextrin, commercial product Avedex 58-MD-14, from AVEBE
II. Cold-soluble potato starch, Paselli WA-4
III. Cold-soluble wheat starch, Cremocine B
IV. Carboxymethylcellulose, Tylose H20
V. Tylose C30, from Hoechst
VI. Starch p.a.

Especially hard granular products were obtained using starch p.a. and native potato starch. The other binding agents likewise gave comparatively hard granules.

EXAMPLE 7

Preparation of Granulated Strontium Carbonate with 0.5 wt.-% of Carboxymethylcellulose as Binding Agent, without high-temperature treatment Example 6, IV, was repeated. This time a Tylose H20 solution was used in such an amount that 0.5 wt.-% of Tylose H20, with respect to the dry mass, was contained as binding agent. Again, hard, free-flowing granular products were obtained.

EXAMPLE 8

Preparation of Granulated Strontium Carbonate with Water Glass, without High-Temperature Treatment Example 6 was repeated. This time a sodium silicate solution (water glass) was added in such an amount that 5 wt.-% of sodium silicate, with respect to the dry mass, was contained as binding agent. In this test, too, hard, free-flowing granular products were obtained.

EXAMPLE 9: Preparation of granulated strontium carbonate from dry $SrCO_3$ powder, without drying, and with high-temperature treatment.

Example 1 was repeated. This time the $SrCO_3$ was introduced into the high-speed mixer in the form of dry $SrCO_3$ powder. Recycled dust and undersized granules from earlier granule production, caustic soda solution and sodium polyacrylate (Sokalan PA20 ™) as well as water were added, so that the amounts of water, $Na_2O$ and Sokalan PA20 TM specified in Example 1 were established. The material leaving the high-speed mixer was fed without drying into the fluid-bed dryer where it was further treated as described in Example 1.

EXAMPLE 10

Preparation of Granulated Strontium Carbonate from Strontium Carbonate Containing 17% of Water by Weight Example 1 was repeated. This time the moisture content was adjusted to 17 wt.-%. The rest of the procedure was as described in Example 1.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A method for preparing granulated calcium carbonate, barium carbonate or strontium carbonate, comprising the steps of:

granulating an alkaline earth metal carbonate selected from the group consisting of calcium carbonate, barium carbonate and strontium carbonate in the presence of water and a binding agent, wherein said water is present in an amount up to 17 wt.-% based on the dry weight of the alkaline earth metal carbonate and said binding agent is present in an amount of from 1 to 5 wt.-% based on the dry weight of the alkaline earth metal carbonate; and subsequently drying the granulated alkaline earth metal carbonate in a separate drying step at a temperature of from 100° to 250 ° C.; and wherein said alkaline earth metal carbonate is maintained out of contact with inorganic refractory materials during and after said granulating step and said drying step.

2. A method according to claim 1, further comprising subjecting dried, granulated alkaline earth metal carbonate from said drying step to a subsequent calcining treatment while maintaining said alkaline earth metal carbonate out of contact with inorganic refractory materials.

3. A method according to claim 1, wherein granulation is carried out in an apparatus selected from the group consisting of high-speed mixers, granulating mixers, and granulating disks.

4. A method according to claim 1, wherein said drying is carried out in a drum dryer.

5. A method according to claim 2, wherein said drying and said calcining are carried out in a drum dryer.

6. A method according to claim 2, wherein said drying and said calcining treatment are carried out in a fluidized bed dryer.

7. A method according to claim 1, wherein said alkaline earth metal carbonate is barium carbonate or strontium carbonate.

8. A method according to claim 1, wherein said binder comprises a binder substance selected from the group consisting of dextrin, common starch, native potato starch, cold-soluble potato or wheat starch, carboxymethylcellulose, and polyvinyl alcohol.

* * * * *